Patented Jan. 1, 1935

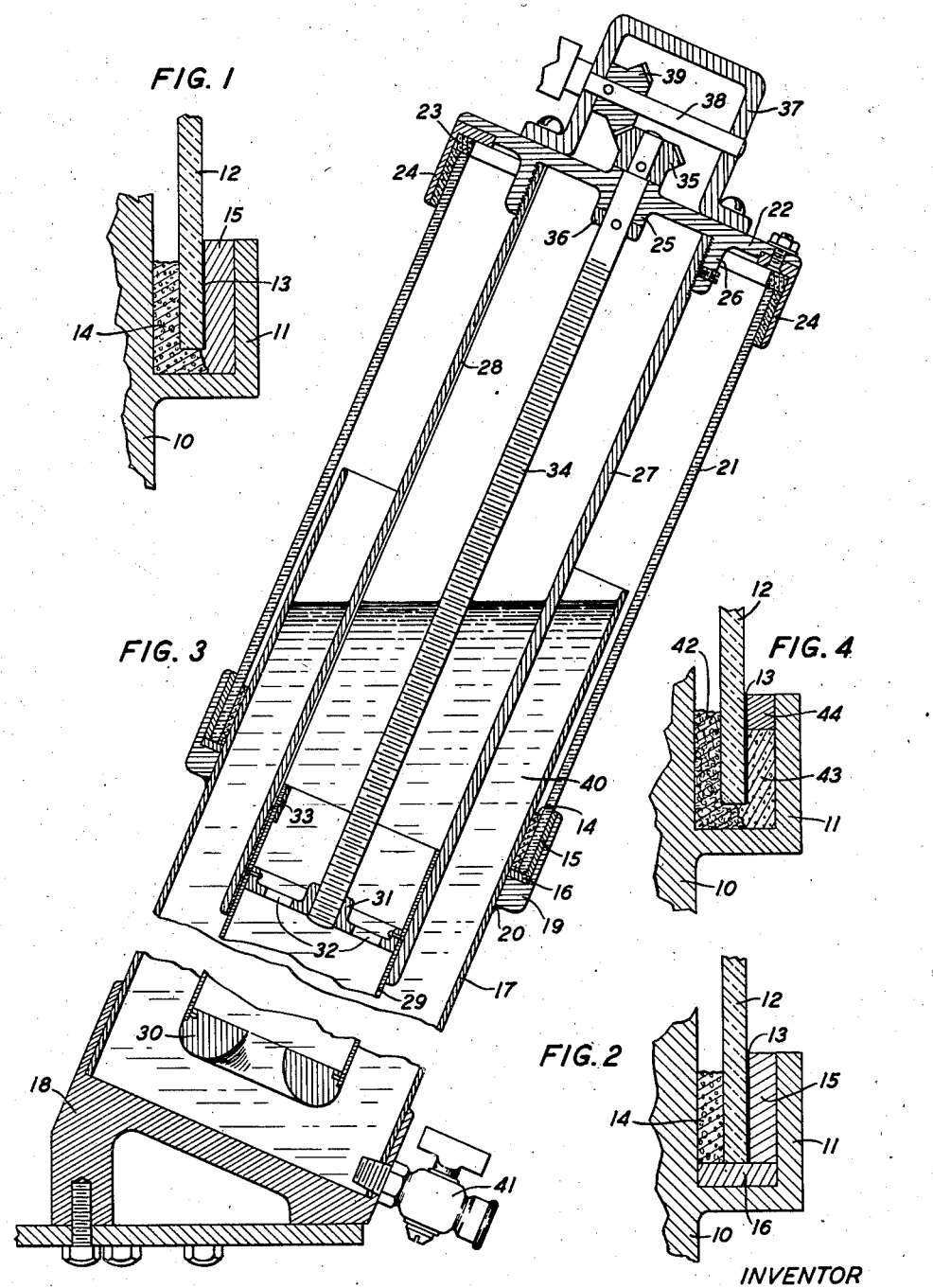

1,986,656

UNITED STATES PATENT OFFICE 1,986,656

SEALED JOINT AND METHOD OF MAKING SAME

Howard W. Weinhart, Elizabeth, N. J., assignor to Bell Telephone Laboratories, Incorporated, New York, N. Y., a corporation of New York Application October 20, 1932, Serial No. 638,748

13 Claims. (Cl. 49—81)

This invention relates to a sealed joint and a method of making the same, for instance, between a vitreous material, such as glass, and a metallic body, and is particularly concerned with a seal for electrical devices in which wide temperature variations affect the permanence of a seal.

Usually in high voltage devices, such as mercury vapor rectifiers, high voltage, water-cooled electron discharge devices, high voltage dielectric condensers and similar electrical structures, the containing vessel is formed partly of metal and partly of a vitreous material, such as glass. Frequently, a metallic conductor is sealed through the vitreous portion of the vessel to provide a connection for electrodes within the vessel. It is necessary in such devices to provide an air-tight, hermetic seal between the metal portion and the glass portion and between the conductor and the glass portion, to insure constant and continuous operation of the device even when the device is subjected to large differences of temperature both internally and externally.

An object of this invention is to join a fragile member to a refractory member and seal these members together in a simple and inexpensive manner, the seal to remain gas-tight throughout long periods of time and throughout a comparatively large temperature range.

Another object of the invention is to form the seal in such a manner that strains set up in the fragile member, due to expansion of the metallic member, are prevented from reaching the breaking point.

The general aspect of this invention resides in a seal between metal and a fragile material, such as glass and consists in three important steps in the production of the seal as follows; first, metallizing or coating with a metallic layer a portion of the glass which is to be joined to the metallic portion; second, inserting the metallized glass portion in a cavity, groove or flange on the metallic portion and packing a shock absorbing material or barrier in the groove on one side of the glass to metal seal, and thereafter filling the groove on the opposite side of the glass with a sealing medium which adheres to the metallic layer on the glass.

The shock absorbing barrier performs two useful functions in this type of seal, one being the prevention of the flow of a sealing material, such as solder on both sides of the glass and the other being the counteracting resiliency of the material against straining the glass to its breaking point when the metal on the opposite side of the glass wall expands to a maximum degree.

In a specific aspect of the invention, a vacuum-tight seal is applied to a high voltage balancing condenser which is filled with oil to serve as a dielectric and cooling medium. The seal is produced by forming a platinum coating on the glass cylindrical portion which is later electro-plated and tinned. The metallized glass is inserted in a hollow flange surrounding a metallic casing of the condenser and damp asbestos cord is tamped securely into the flange between the wall of the casing and the inner surface of the glass portion. A sealing material, such as solder, is deposited in the flange outside of the glass portion and adheres to the metal and the metallized glass portion to form the seal. This type of seal overcomes the seepage of oil from the condenser and at the same time insures a tight union between the glass and metal portions of the condenser, to prevent breakdown discharges.

A feature of the invention relates to a floating type of seal i. e., the edge of the glass portion is maintained out of contact with the flange portion of the metallic vessel by the shock absorbing material so that the solder in flowing into the joint does not encase the edge of the glass in metal. This arrangement avoids fracture of the glass due to the difference of expansion between the solder and the glass.

Another feature of the invention relates to a floating type of seal in which litharge is placed in the groove outside of the glass portion and a thin layer of solder superimposed on the litharge layer forms the hermetic seal.

These and other features of the invention will be more clearly understood from the following detailed description in connection with the accompanying drawing:

Fig. 1 is an enlarged view, in cross-section, of a glass to metal joint made in accordance with this invention in which the glass is floated in the seal by the shock absorbing material;

Fig. 2 is an enlarged view, in cross-section, of another form of seal in accordance with this invention in which the glass portion is supported in the flange by spacing members;

Fig. 3 shows a high voltage balancing condenser in cross-section embodying the type of seal shown in Fig. 2; and Fig. 4 illustrates in cross-section a modified form of seal in accordance with this invention in which a composite sealing material is incorporated in the sealed joint.

Referring to the drawing, the type of seal to which this invention is applicable is clearly shown in Fig. 1 and consists essentially of a metallic body 10 having a hollow flange portion 11, formed integral therewith, or rigidly affixed thereto and extending exteriorly of the metallic body which may form a vessel or receptacle. The flange 11 forms a hollow groove or channel between the surface of the metallic body and the adjacent parallel wall of the flange. A vitreous or fragile body 12, for instance of glass, which is to be joined to the metallic body 10 has a portion of one surface metallized, as shown at 13, by forming a coating of platinum on the glass which is later electroplated to form a copper surface thereon and finally coated with a layer of tin which serves as a flux with a sealing material, such as solder, to bind the glass body to the metallic body. The glass body 12 is centrally positioned in the channel or groove of the flange 11 and held in floating position as shown in Fig. 1 until a suitable amount of a shock-absorbing material 14, such as asbestos cord, has been securely tamped into the channel between the glass body 12 and the inner surface of the metallic body 10. It is preferable to moisten the asbestos cord prior to tamping it into the channel in order to avoid air spaces between the fibers. Furthermore, sufficient pressure is exerted on the tamped asbestos fibers to introduce an initial strain in the glass body 12 for a purpose to be hereinafter described. The strain placed upon the glass body 12 is not sufficient, however, to cause fracture of the glass. In packing the fibrous asbestos material 14 in the groove, it is necessary to insure that the material is forced under the edge of the glass body 12, to form a cushion for the glass member 12 and to form a barrier, to prevent the flow of metal around the edge of the glass. The seal is completed by pouring a sealing medium 15, such as molten solder, in the groove or channel of the flange 11 in contact with the metallized surface 13 of the glass member. The molten solder 15 flowing into the flange causes expansion of the glass member, due to the transfer of heat from the molten solder, but in view of the initial strain produced in the glass by the cushion or shock-absorbing material 14, the pressure exerted by the glass member is relieved or counteracted so that expansion does not reach a point where fracture occurs. The molten sealing material 15, during the cooling process, adheres or sweats to the metallized coating on the glass body 12 and under the pressure of the cushion material 14 and the contraction of the solder forms a tight seal between the flange 11 and the glass body 12.

The seal shown in Fig. 2 is similar to the seal described above except that the glass body 12 is supported in the flange 11 by a plurality of spacing lugs 16 which support the edge of the glass member 12 from the bottom surface of the channel in the flange 11. In this construction it is however necessary to securely pack the cushion material 14 under the edge of the glass member 12 between the several spacing lugs 16 to prevent the flow of metal around the edge of the glass member 12.

The type of seal as shown in Fig. 2 is applied to a high voltage balancing condenser as shown in Fig. 3 in which a metallic cylindrical vessel 17 supported on a tilting base 18 is provided with an annular flange portion 19 which is welded to the surface of the metallic vessel 17 intermediate the ends thereof at 20. A cylindrical glass portion or member 21 having a diameter intermediate the diameters of the metallic vessel 17 and the outer wall of the flange 19 is metallized as heretofore described on the lower outer surface which is enclosed in the channel formed by the flange 19. The glass portion 21 may be spaced from the interior bottom surface of the flange by spacing lugs 16, as described in connection with Fig. 2. The portion of the glass member 21 within the flange 19 is strained outwardly by tamping the cushion material, such as asbestos cord 14, between the surface of the metallic member 17 and the inner surface of the glass member 21 and then the molten solder 15 is poured in the flange between the metallized glass surface and the inner surface of the flange wall to form the hermetic seal between the glass member 21 and the metallic vessel 17.

The other end of the glass member 21 is closed by a metallic cap 22 which is secured to the glass member by cement or other adhesive means. The metallic cap may be secured to the glass member 21 by inserting an annular cushion 23, such as rubber or asbestos, between the edge of the glass member 21 and the cap 22 and then filling the space between the outer surface of the glass member 21 and the surface of the cap with a sealing medium, such as cement. Another method of forming this seal is to make the cap in two parts such as an annular flange 24 and the top piece which forms the major portion of the cap 22. These portions may be bolted together to form a rigid structure. When the two-piece cap is used, it is desirable to insert the rubber cushion 23 between the flange and the edge of the glass member 21 and then the cement is inserted in the groove between the glass member and the flange and after setting, the rubber cushion may be removed. The major portion of the cap may then be placed in position and bolted to the flange 24. The cap member 22 is provided with a central apertured hub 25 and an internal annular flange 26, which is threaded internally to receive a metallic cylindrical sleeve 27 which extends into the metallic vessel 17. The sleeve 27 is provided with a longitudinal slot or guideway 28. Within the sleeve 27 is a cylindrical metallic condenser element which is axially movable with respect to the cylindrical wall of the vessel 17. This movable condenser element consists of a cylindrical metallic shell 29 which is partially closed by an apertured metallic member 30 and is provided with a bridging disc 31 which is rigidly attached to the cylindrical shell 29 intermediate the ends thereof. The disc 31 is provided with a threaded hub in the central portion and on opposite sides of the hub apertures 32 are provided. A guide pin 33 in the wall of the shell 29 adjacent the guide 28 prevents rotation of the movable condenser element and insures sliding engagement with the sleeve 27. The movable condenser element is slidably propelled in the sleeve 27 by its engagement with a threaded shaft 34 which projects through the central hub in the disc 31 and is coupled to a spur gear 35 on one side of the hub 25 in the cap member 22. A sleeve 36 on the threaded shaft 34 prevents axial movement of the shaft with respect to the cap 22. A housing 37 supported exterior to the cap 22 carries a shaft 38 which is arranged transverse to the threaded shaft 34 and a gear 39 attached to the shaft 38 is coupled to the gear 35 on the shaft 34. The end of the shaft 38 exterior to the housing 37 may be extended to any desirable means, not shown, for imparting rotation to the shaft 38 and gear 39. When the gear 39 rotates, the coupling of this gear with the gear 35 causes rotation of the shaft 34 and consequently the movable condenser element is moved upwardly or downwardly depending on the direction of rotation of the shaft 38. The movement of the condenser element attached to the shaft 34 determines the amount of capacity between the metallic shell 29 of the movable element and the wall of the casing 17. In order to provide a suitable dielectric or insulating medium between the movable element and the casing, a fluid such as oil 40 is deposited in the vessel 17 and extends to such a level that when the device is at an angle, as shown in Fig. 3, the level of the oil is just below the edge of the metallic receptacle 17. It will be noted that the apertures in the metallic member 30 and the bridging disc 31 permit the fluid or oil to flow through the movable condenser element and thereby serves as a cooling medium. The dielectric fluid may be replaced by drawing the fluid off through the drain valve 41 and the device filled with a new supply by removing the cap member 22.

In the operation of the high voltage balancing condenser, as shown in Fig. 3, the expansion of the dielectric fluid often causes some of the fluid to flow over the edge of the metallic receptacle 17, but in view of the type of seal produced between the flange 19 and the glass member 21, in accordance with this invention, the seepage of oil through the seal is prevented and the seal insures a tight union or hermetic joint between the glass and metal portion of the condenser to prevent breakdown discharges. Similar seals may be used in oil fuses, circuit breakers, transformers and electrolytic condensers.

While the types of seals as shown in Figs. 1 and 2, are satisfactory for devices composed of a metal portion and a glass portion in which a fluid medium is employed, it is evident that such a seal may present difficulties when applied to other electrical devices, such as a mercury vapor device, a gaseous discharge device or a highly evacuated discharge device.

In accordance with this invention, the seal for these devices is shown in Fig. 4 in which the metallic portion of the device is shown at 10 as having a flange portion 11, similar to the seals shown in Figs. 1 and 2, and a glass portion 12 which is situated in the flange 11. The cushion or shock-absorbing material in this type of seal is preferably a material which does not absorb gases or give off gases at elevated temperatures and which can easily be outgassed during the evacuation of the device. Such a material may be, for instance, steel wool 42 which is packed into the flange between the glass portion 12 and the metallic vessel 10 and may support the glass member 12 in a floating condition by being forced under the edge of the glass, the same as the asbestos packing shown in Fig. 1. The seal may be produced by filling the flange on the opposite side of the glass member 12 with an adhesive material 43, such as cement, litharge or other viscous substance. A thin layer of a sealing medium 44, such as solder, which forms the sealing joint between the flange 11 and the metallic surface 13 deposited on the glass member 12 is sperimposed on the cement 43. In this type of seal the steel wool serves the same purpose as the asbestos cord in the seals of Figs. 1 and 2 but has the advantage that it does not readily absorb gas or expel gas during the operation of a device, such as a mercury vapor rectifier or a high vacuum discharge device. The cement binder in the seal is a mechanical support for the glass member and the hermetic seal is formed by the solder which forms a tight union between the flange and the glass member.

Although various modifications of the seal of this invention are disclosed, it is, of course, understood that changes may be made in the disposition of the materials of the seal to accomplish the same purpose. For instance, the seal is disclosed as being formed in a groove on the exterior of the metallic member. It is obvious that the flange formed on the metallic member may be within the interior of the metallic vessel. Furthermore, the seal may be reversed by placing the cushion material exterior to the glass member and filling the remainder of the groove on the opposite side of the glass member with the sealing material. It is also obvious that the composite seal as shown in Fig. 4 may be substituted for the metallic seal shown in Figs. 1 and 2. Various other modifications may be made in the structure of the seal without departing from the scope of the invention as defined in the appended claims.

What is claimed is:

1. A sealed joint comprising a body having a double wall portion at one end, a fragile body within said double wall portion, a cushion material between one of said wall portions and said fragile body, and a sealing material between said fragile body and said other wall portion.

2. A sealed joint comprising a body having a double wall portion at one end, a fragile body within said double wall portion, a fibrous packing between one of said wall portions and said fragile body, and a fusible sealing medium between said fragile body and said other wall portion.

3. A sealed joint comprising a metallic body having a double wall portion at one end, a vitreous member within said double wall portion, a cushion material between one of said wall portions and said vitreous member, and a sealing material between said vitreous member and said other wall portion.

4. A sealed joint comprising a metallic body having a double wall portion at one end, a vitreous member within said double wall portion, a fibrous packing between one of said wall portions and said vitreous member, and a fusible sealing medium between said vitreous member and said other wall portion.

5. A sealed joint comprising a metallic member having a flange forming a cavity, a fragile member situated in said cavity, spacing means in said cavity for supporting said fragile member from the bottom of said flange, strain producing material between said metallic member and fragile member, and sealing material between said fragile member and flange.

6. A sealed joint comprising a metallic member having a portion formed with parallel opposed surfaces, a glass member positioned intermediate said surfaces, means between said glass member and one of said surfaces for initially straining said glass member, and fusible sealing means filling the space between said glass member and the other opposed surface of said metallic member.

7. A seal between metal and glass comprising a metallic member having a cavity, a metallized glass member inserted in said cavity, a filling of solder in said cavity on the exterior surface of said glass member, and a yielding insulating material in said cavity on the inner surface of said glass member.

8. A seal between metal and glass comprising a metallic member having a groove therein adjacent one edge, a vitreous member positioned in said groove, said vitreous member having a metallic coating on its outer surface, means for spacing said vitreous member from the bottom of said groove, a packing of insulating material in said groove between the inner wall of said vitreous member and said metallic member, and a filling of fusible metallic material in said groove intimately joining said metallic member to the metallic coating on said vitreous member.

9. In the manufacture of a composite receptacle of metal and glass comprising a grooved metallic portion, a glass portion located therein, fibrous insulating material in said groove on one side of said glass portion, and fusible sealing material in said groove on the other side of said glass portion, the method of sealing said glass portion to said metallic portion which comprises locating said glass portion in said groove entirely free from the metallic portion, packing fibrous material between said glass portion and one surface of said groove, and flowing fusible metallic material in said groove between said glass portion and the other surface of said groove.

10. In the manufacture of a composite receptacle of metal and glass comprising a grooved metallic portion, a glass portion located therein and a sealed joint therebetween, the method of sealing said glass portion to the metallic portion which comprises initially straining said glass member on one side in said groove by a packing material, and pouring a sealing metal in said groove in contact with the other side of said glass portion.

11. The method of joining a metallic receptacle having a grooved portion to a glass section which comprises spacing the edge of said glass section from the bottom of said groove, packing a fibrous material in the groove between one wall thereof and said glass section, and filling said groove exterior to said glass section with a fusible sealing metal.

12. The method of joining a metallic receptacle having a grooved portion to a glass section which comprises metallizing a portion of the surface of said glass section, supporting the glass section with the metallized portion within said groove in a floating condition, packing a fibrous material in the groove between one wall thereof and said glass section, and filling said groove exterior to said glass section with a fusible sealing metal.

13. The method of joining a metallic tubular member having a grooved end portion to a tubular glass portion which comprises metallizing a section of the glass wall, inserting the glass portion in said groove, straining said glass portion outwardly with a packing material between said member and said glass portion, partially filling said groove with a binding material, and thereafter flowing molten solder in said groove to fuse to said metallized glass portion.

HOWARD W. WEINHART.